United States Patent [19]

Ohya et al.

[11] Patent Number: 5,436,751
[45] Date of Patent: Jul. 25, 1995

[54] ANALOG OPTICAL TRANSMISSION SYSTEM AND OPTICAL FIBER AMPLIFIER

[75] Inventors: Jun Ohya; Toshihiro Fujita, both of Osaka, Japan

[73] Assignee: Matsushita Electric Industrial Co., Ltd., Osaka, Japan

[21] Appl. No.: 982,166

[22] Filed: Nov. 24, 1992

[30] Foreign Application Priority Data

Dec. 2, 1991 [JP] Japan .................. 3-317729

[51] Int. Cl.⁶ .................. G02F 2/00; H04B 15/00
[52] U.S. Cl. .................. 359/182; 359/156; 359/122
[58] Field of Search .......... 359/156, 122, 154, 161, 359/162, 180, 181, 182, 132

[56] References Cited

U.S. PATENT DOCUMENTS

| | | | |
|---|---|---|---|
| 4,560,246 | 12/1985 | Cotter | 359/156 |
| 4,893,300 | 1/1990 | Carlin et al. | 359/162 |
| 5,008,958 | 4/1991 | Cimini, Jr. et al. | 359/156 |
| 5,166,821 | 11/1992 | Huber | 359/173 |
| 5,200,964 | 4/1993 | Huber | 372/26 |
| 5,204,923 | 4/1993 | Grasso et al. | 359/156 |
| 5,210,808 | 5/1993 | Grasso et al. | 359/156 |

FOREIGN PATENT DOCUMENTS 404156014 5/1992 Japan .................. 359/156

*Primary Examiner*—Hezron E. Williams
*Assistant Examiner*—Richard A. Moller
*Attorney, Agent, or Firm*—Lowe, Price, LeBlanc & Becker

[57] ABSTRACT

In an optical transmission system for transmitting a video signal by transmitting a laser light modulated with a video signal, through an optical fiber; and for receiving and photoelectrically converting the received laser light, a pilot signal is added to the video signal by a summing amplifier. A frequency of the pilot signal is smaller than a band width of the laser light, so that peak level of interference noise developed by multi-reflection at both ends of the optical fiber is decreased considerably. Moreover, in an optical transmission system for transmitting and receiving a video signal by modulating a laser light with the video signal through an optical fiber; and for receiving and photoelectrically converting the received laser light, a polarizing control element is provided in the optical fiber by coiling the optical fiber, so that a signal laser light transmitted without multi-reflection has different retardation from a signal laser light with multi-reflection, so that interference noise is reduced. Similarly, an optical fiber amplifier also employs the polarizing control element to reduce the adverse effect caused by the interference noise.

7 Claims, 4 Drawing Sheets

ANALOG OPTICAL TRANSMISSION SYSTEM AND OPTICAL FIBER AMPLIFIER

BACKGROUND OF THE INVENTION

1. Field of the Invention

This invention relates to an analog optical transmission system and an optical fiber amplifier.

2. Description of the Prior Art

An analog optical transmission system is known. Such an analog optical transmission system transmits a video signal such that laser light is intensity-modulated with the video signal directly and the modulated laser light is transmitted through an optical fiber. In such an analog optical transmission system, a plurality of channels of video signals may be transmitted by frequency multiplexing techniques. This prior art analog optical transmission system features a low cost per channel in building transmission lines than other systems. Moreover, if the system is used in a CATV network, the number of relay amplifiers is reduced because, in this system, a transmission distance without a relay can be larger than in coaxial cable transmission line systems.

FIG. 9 is a block diagram of a prior art analog optical transmission system. The prior art analog optical transmission system comprises: an amplifier 2 to which a video signal is applied through an input terminal 1; a semiconductor laser module 3 for emitting laser light and for intensity-modulating the laser light with the amplified video signal; an optical fiber 4 for transmitting the laser light emitted and modulated by the laser module 3; a photosensitive unit 5 for receiving the transmitted laser light and converting it into an electronic signal; and an amplifier 6 for amplifying the electronic signal to output the amplified electronic signal at an output terminal 7. The semiconductor laser modulator 3 is connected to the optical fiber 4 by an optical connector 8. Similarly, the photosensitive unit 5 is connected to the optical fiber 4 by an optical connector 9. A plurality of analog video signals (channel 1 to channel N; N is a natural number more than one) are RF-multiplexed and are added to each other to produce RF-multiplexed analog video signals CH1-CHN. The RF-multiplexed analog video signals are inputted to an input terminal 1 to transmit the video signals to the photosensitive unit 5. The laser module 3 intensity-modulates an output laser beam in accordance with the inputted RF-multiplexed analog video signals. This prior art analog optical transmission system can transmit analog AM (amplitude modulation) video signals of more than 40 channels over 10 Km distance without a relay.

Optical fiber amplifiers are known in the art. Such an optical fiber amplifier comprises a quartz type optical fiber having a core into which a rare earth element, such as erbium (Er), is doped. The erbium-doped optical fiber exhibits amplification properties in the 1550 nm band where quartz type optical fibers show low loss. Such an optical fiber amplifier improves allowable dissipation if it is used as an in-line amplifier or a post amplifier.

However, in the prior art analog optical transmission system shown in FIG. 9, there is a problem that noise or distortion of the received video signal at the output terminal 7 is developed by multi-reflection between the optical connectors 8 and 9. More specifically, wavelength variation of the laser light due to modulation with the video signals is converted into magnitude variation by the multi-reflection between the optical connectors 8 and 9, so that noise or distortion is developed due to the magnitude variation in the received video signal at the output terminal 7.

Hereinbelow will be described this problem concretely with reference to FIG. 10. FIG. 10 is a spectrum diagram of the received video signals in the prior art analog optical transmitted system shown in FIG. 9.

In this prior art analog optical transmission system, a modulation frequency is 300 MHz (RF band) and a modulation factor is 5%. As shown in FIG. 10, in the prior art analog optical transmission system, large peaks of interference noise are developed at a lower frequency region than the modulation frequency 300 MHz and harmonic frequencies (600 MHz and 900 MHz) of the modulation frequency. The shape of the noise peaks reflects a spectrum width of the laser module 3 and frequency bands of the noise peaks are dependent on an amount of a maximum frequency shift of the laser light.

In the optical fiber amplifier, the larger the amount of multi-reflection laser light, the larger in the magnitude of interference noise developed in the optical transmission line. Therefore, in an analog optical transmission system in which an optical fiber amplifier is used, an S/N ratio decreases when the multi-reflection occurs in the optical fiber amplifier. This is because multi-reflected light is also amplified, so that interference noise is increased.

SUMMARY OF THE INVENTION

The present invention has been developed in order to remove the above-described drawbacks inherent to the conventional analog optical transmission system and the conventional optical fiber amplifier.

According to the present invention there is provided an analog optical transmission system comprising: a summing amplifier for adding an input analog video signal or an analog video signal to a pilot signal; a laser module for emitting laser light with intensity-modulation by an output from the summing amplifier; an optical transmission line, for transmitting the laser light; and a photosensitive unit for receiving the transmitted laser light and for converting the transmitted laser light to an electrical output signal.

According to the present invention there is also provided an analog optical transmission system comprising: a laser module for emitting laser light and for intensity-modulating the laser light in accordance with an input signal; an optical transmission line, namely, an optical fiber for transmitting the modulated laser light, including: a polarizing control element provided in the optical optical fiber 4, for changing a polarizing plane of the modulated laser light by the predetermined angle, for example, $\pi/4$, per once transmission therethrough in order to differentiate an angle of polarizing plane of the modulated laser light emitted from the optical fiber 4 without multi-reflection at both ends of the optical fiber 4 from that of the modulated laser light subjected to the multi-reflection; and a photosensitive unit 5 for receiving the transmitted laser light and for converting the transmitted laser light to the electrical output signal.

According to the present invention there is further provided an optical fiber amplifier comprising: an optical fiber having a core to which a rare earth element is doped, for receiving a signal light having a first wavelength $\lambda_1$ at a first end thereof and for transmitting the signal light, the optical fiber including polarizing control element provided in the optical fiber, for changing a polarizing plane of the signal light by a predetermined angle, for example, $\pi/4$, per once transmission therethrough in order to differentiate an angle of polarizing plane of the signal light emitted from the optical fiber without multi-reflection at both ends of the optical fiber from that of the signal light subjected to the multi-reflection; a laser light source for emitting a laser light having a second wavelength $\lambda_2$ shorter than the first wavelength $\lambda_1$; and a wavelength division multiplexer having first, second, and third terminals for introducing the laser light into the optical fiber through the first and second terminals, the laser light exciting the rare earth element which emits the laser light amplified in accordance with the signal light; for receiving the amplified signal light at the second terminal; and for outputting the amplified signal at the third terminal.

BRIEF DESCRIPTION OF THE DRAWINGS

The object and features of the present invention will become more readily apparent from the following detailed description taken in conjunction with the accompanying drawings in which.

The same or corresponding elements or parts are designated as like references throughout the drawings.

DETAILED DESCRIPTION OF THE INVENTION

Hereinbelow will be described a first embodiment of this invention with reference to drawings.

Figure 1:
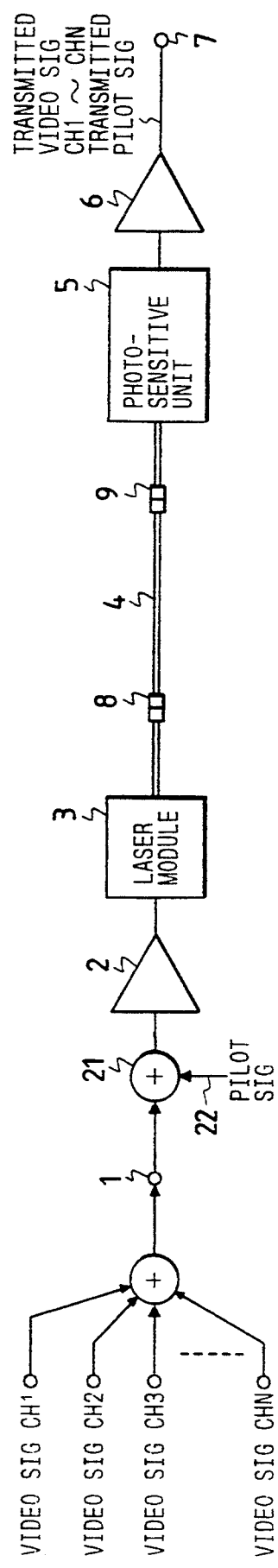
FIG. 1 is a block diagram of a first embodiment of an analog optical transmission system.

FIG. 1 is a block diagram of the first embodiment of an analog optical transmission system. In FIG. 1, RF-multiplexed analog video signals CH1-CHN are inputted to an input terminal 1.

The analog optical transmission system comprises: a summing amplifier 21 for summing RF multiplexed analog video signals from an input terminal 1 and a pilot signal 22; an amplifier 2 for amplifying the RF multiplexed analog video signals and the pilot signal 22; a semiconductor laser module 3 for emitting laser light and for intensity-modulating the laser light with the amplified RF multiplexed analog video signals and the pilot signal 22; an optical fiber 4 for transmitting the laser light emitted by the laser module 3; a photosensitive unit 5 for receiving the transmitted laser light and converting the transmitted laser light into electronic signals; and an amplifier 6 for amplifying the electronic signals to output the amplified electronic signals including the transmitted RF multiplexed analog video signals and the pilot signal 22 at an output terminal 7. The semiconductor laser module 3 is connected to the optical fiber 4 by an optical connector 8. Similarly, the photosensitive unit 5 is connected to the optical fiber 4 by an optical connector 9.

The RF multiplexed analog video signals are obtained as follows:

A plurality of analog video signals CH1-CHN (channel 1 to N channel; N is a natural number more than one) having different frequencies are added to each other. In this embodiment, the channel one has a carrier frequency of 300 MHz. The added video signals, namely RF-multiplexed analog video signals CH1-CHN are inputted to the input terminal 1 to transmit the video signals to the photosensitive unit 5.

In this embodiment, the input signal is the RF-multiplexed analog video signals CH1-CHN. However, one analog video signal having a RF-frequency can be used.

Hereinbelow will be described the operation of the first embodiment.

The RF-multiplexed analog video signals CH1-CHN are added to the pilot signal 22 of 10 MHz having sinusoidal waveforms by the summing amplifier 21. In this embodiment, the video signal CH1 of channel 1 has 300 MHz carrier frequency, the laser module 3 emits laser light having 30 MHz spectrum band width. That is, the RF-multiplexed analog video signals CH1-CHN including the video signal CH1 having 300 MHz carrier frequency are added to the pilot signal 22 of 10 MHz which frequency is smaller than the spectrum band width of the laser light from the laser module 3. Then, an output of summing amplifier 21 is amplified by the amplifier 2 and the laser module 3 intensity-modulates the laser light from the laser module in accordance with the video signals and the pilot signal 22. The laser light is transmitted by the optical fiber 4 and received by the photosensitive unit 5. The photosensitive unit 5 converts the received laser light to the electric signals of the transmitted video signals CH1 to CHN. The amplifier 6 amplifies the transmitted video signals and the transmitted pilot signal 22.

Figure 2:
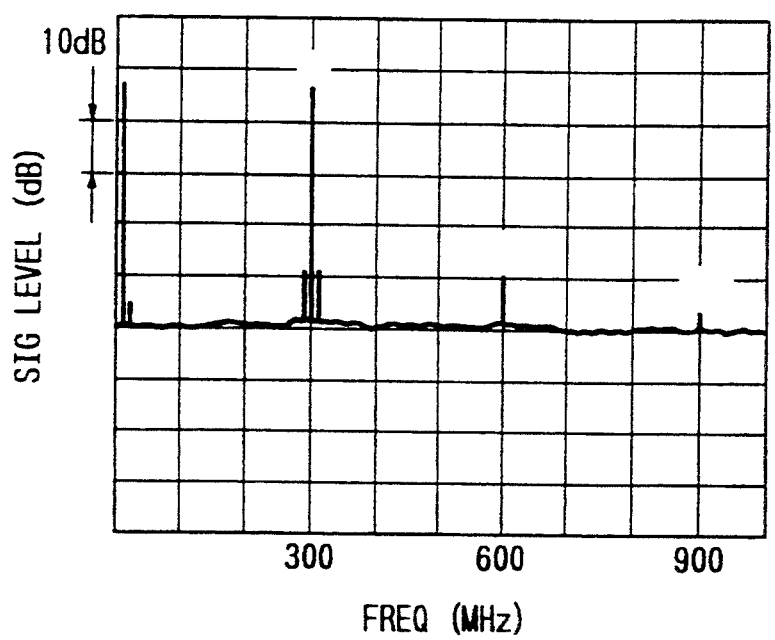
FIG. 2 shows a spectrum diagram of an output of the analog optical transmission system of the first embodiment.
Figure 4:
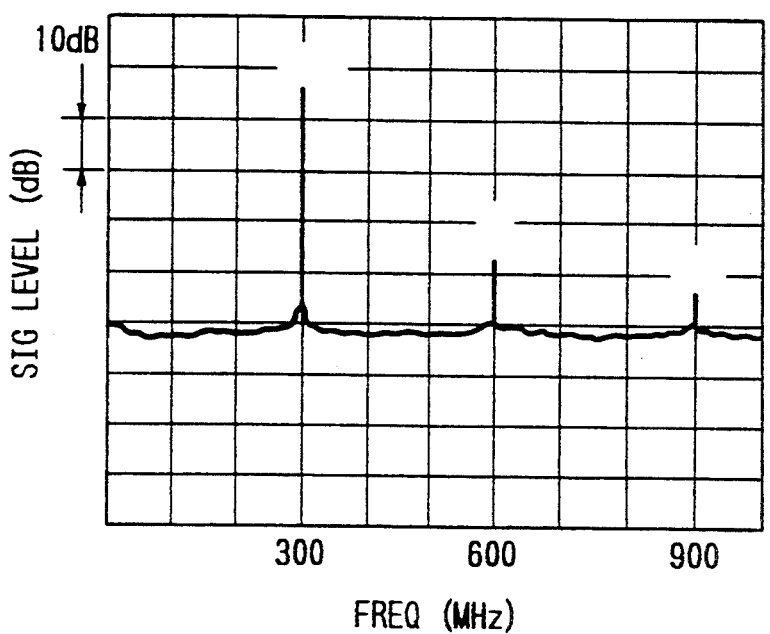
FIG. 4 shows a spectrum diagram of an output of the analog optical transmission system of the second embodiment.
Figure 9:
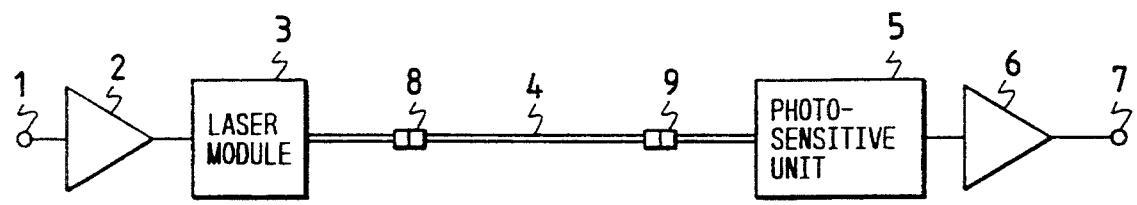
FIG. 9 is a block diagram of a prior art analog optical transmission system.
Figure 10:
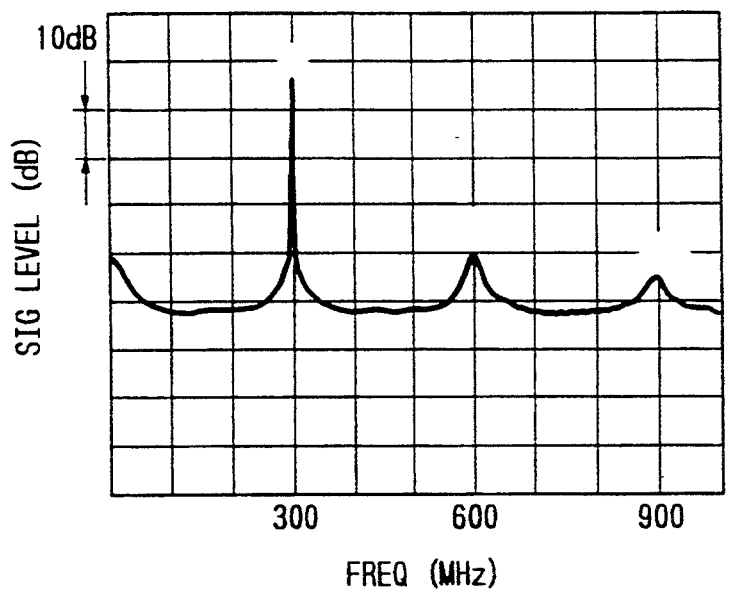
FIG. 10 is a spectrum diagram of the received video signals in the prior art analog optical transmitted system shown in FIG. 9.

FIG. 2 shows a spectrum diagram of the photoelectrically converted signals from the output of the photosensitive unit 5 when only video signal channel 1 (300 MHz) is inputted to the input terminal 1. The modulation index of the video signal channel 1 is 5% which is the same as that of the prior art shown in FIGS. 9 and 10. The modulation index of the pilot signal 22 is also set to be 5% to be detected at the output of the analog optical transmission system. That is, the frequency and the intensity of the pilot signal 22 are predetermined. As clearly shown by comparison between FIG. 2 and FIG. 10 of the spectrum diagram of the prior art, peak magnitudes of interference noise shown in FIG. 2 are reduced compared with the prior art shown in FIG. 9 at a lower frequency than the modulation frequency of 300 MHz, the modulation frequency of 300 MHz, and its harmonic frequencies. That is, peaks of the interference noise is reduced because powers of interference noise developed by multi-reflection does not concentrate to particular frequency points but is defused over a broad frequency band by addition of the pilot signal 22. That is, the laser light emitted from the laser module 3 has a band width of 30 MHz as mentioned above and a center frequency of this band width is shifted in accordance with the modulation signal, namely, the inputted RF-multiplexed analog video signals CH1-CHN. FIGS. 2 and 4 show spectrum diagrams in the case that the analog video signal CH of the channel 1 having the carrier frequency of 300 MHz is inputted. In FIG. 10 of the prior art, peaks of the interference noise occur at every harmonic of the carrier frequency of the video signal channel. However, addition of the pilot signal 21 to the modulation signal for the laser module 3 develops interference noise of the pilot signal 22 at every harmonic of the frequency of the pilot signal 22. Therefore, peaks of the interference noise caused by the pilot signal 22 are developed side by side in the spectrum analysis, so that peak magnitudes of the interference noise are reduced considerably as shown in FIG. 2.

In this embodiment, the optical transmission system is provided by only addition of the summing amplifier 21 supplied with the pilot signal 22 to the conventional analog optical transmission system. Thus, it is not necessary to add any other device to the transmission line facilities which has already equipped.

As mentioned above, the analog optical transmission system of the first embodiment has: a summing amplifier 21 for adding an input analog video signal or the RF-multiplexed analog video signals to the pilot signal 22 having the predetermined intensity and frequency (10 MHz); a laser module 3 for emitting laser light with the laser light intensity-modulated in accordance with the output of the amplifier 2 for amplifying the output of the summing amplifier 21; the optical transmission line, namely, the optical fiber 4 for transmitting the laser light, the predetermined frequency being smaller than the band width of the laser light; and a photosensitive unit 5 for receiving the transmitted laser light and for photoelectrically converting the transmitted laser light to the electrical output signals.

Figure 3:
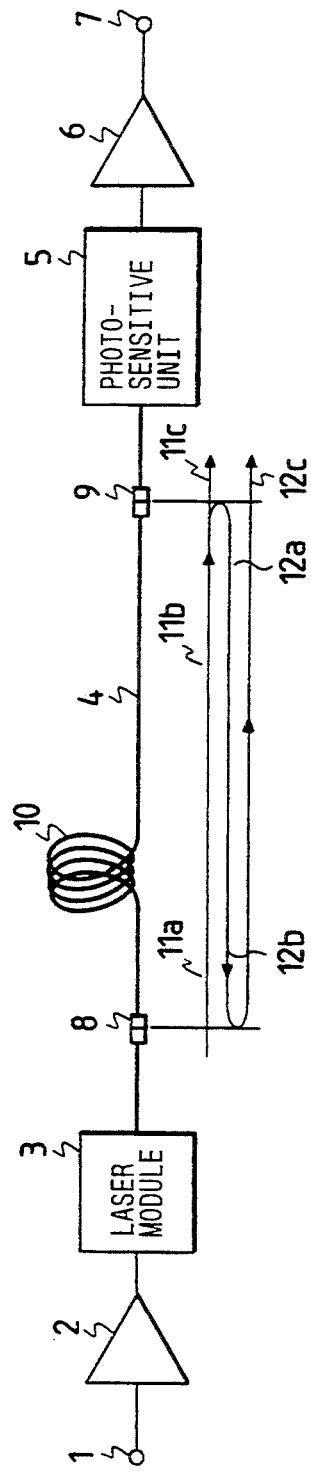
FIG. 3 is a block diagram of a second embodiment of an analog optical transmission system.

Hereinbelow will be described a second embodiment of this invention. FIG. 3 is a block diagram of the second embodiment of the analog optical transmission system.

The analog optical transmission system of the second embodiment comprises: an amplifier 2 for amplifying the RF-multiplexed video signals inputted from an input terminal 1; a semiconductor laser module 3 for emitting laser light and for intensity-modulating the laser light with the amplified multiplexed video signals; an optical fiber 4 for transmitting the laser light 11a emitted by the laser module 3; a photosensitive unit 5 for receiving the transmitted laser light 11c and converting the received laser light into electronic signals; and an amplifier 6 for amplifying the electronic signals to output the amplified electronic signals at an output terminal 7. The semiconductor laser module 3 is connected to the optical fiber 4 by an optical connector 8. Similarly, the photosensitive unit 5 is connected to the optical fiber 4 by an optical connector 9. The optical fiber 4 includes a polarizing control element 10. The polarizing control element 10 is formed such that a portion of the optical fiber 4 is coiled. In this embodiment, the optical fiber 4 is coiled four turns with a radius of 3.2 cm, and is then processed to maintain this form. Such a polarizing control element 10 is double refraction type one having one polarizing plane in parallel to the coil plane and the other plane perpendicular to the coil plane and provides $\pi/4$ of retardation with respect to light thereinto.

Hereinbelow will be described the operation of the second embodiment.

The RF-multiplexed analog video signals inputted from the input 1 are amplified by the amplifier 2 and the laser module 3 intensity-modulates an output laser light in accordance with the RF-multiplexed analog video signals. The output laser light is transmitted by the optical fiber 4 including the polarizing control element 10 and is received by the photosensitive unit 5. The photosensitive unit 5 converts the received laser light to the electric signals of the transmitted video signals CH1 to CHN. The amplifier 6 amplifies the received video signals to produce output video signals. The polarizing control element 10 turns a polarizing plane of the output laser light 11a by $\pi/4$ per one transmission through the polarizing control element 10. That is, laser light 11c partially transmitted through the optical connector 9 has retardation of $\pi/4$. The remaining portion of the laser light 11b is reflected at the optical connector 9 as the laser light 12a. The laser light 12a is transmitted through the optical fiber 4 and controlled in the polarizing plane again by the polarizing control element 10 as laser light 12b which has a retardation $\pi/2$ relative to the laser light 11a. The laser light 12b is transmitted through the optical fiber 4 and the polarizing control element 10 again after reflection at the optical connector 8 to have a total retardation of $\frac{3}{4} \pi$ from the laser light 11a. That is, the multi-reflected laser light 12c has a retardation of $\frac{1}{2} \pi$ from the laser light 11c. That is there is a quadrature relation in polarizing angle between the laser light 11c and 12c. Therefore, the laser light 11c and the multi-reflected laser light 12c inputted to the photosensitive unit 5 do not interfere with each other, so that interference noise caused by multi-reflection in the transmission line, namely, the optical fiber 4 at optical connectors 8 and 9, is reduced.

FIG. 4 shows a spectrum diagram of the photoelectrically converted signal from the output of the photosensitive unit 5 when only video signal channel 1 (300 MHz) is inputted to the input i wherein the modulation factor is 5%. As clearly shown by comparison between FIG. 4 and FIG. 10 of the spectrum analysis of the prior art, magnitudes of interference noise shown in FIG. 4 are reduced compared with the prior art shown in FIG. 9 at a lower frequency than the modulation frequency of 300 MHz, the modulation frequency of 300 MHz, and its harmonic frequencies, so that a preferable S/N ratio is provided. Moreover, the polarizing control element 10 has a very simple structure, that is, a portion of the optical fiber 4 is coiled, so that there is no reflection at both ends of the polarizing control element 10.

As mentioned above, the analog optical transmission system of the second embodiment has: a laser module 3 for emitting laser light and for intensity-modulating the laser light in accordance with an input signal amplified by the amplifier 2; an optical transmission line, namely, the optical fiber 4 for transmitting the modulated laser light, including: a polarizing control element 10 provided in the optical optical fiber 4, for changing a polarizing plane of the modulated laser light by the predetermined angle, namely, $\pi/4$, per each transmission therethrough in order to differentiate an angle of polarizing plane of the modulated laser light emitted from the optical fiber 4 without multi-reflection at both ends of the optical fiber 4 from that of the modulated laser light subjected to the multi-reflection; and a photosensitive unit 5 for receiving the transmitted laser light and for converting the transmitted laser light to the electrical output signal.

Figure 5:
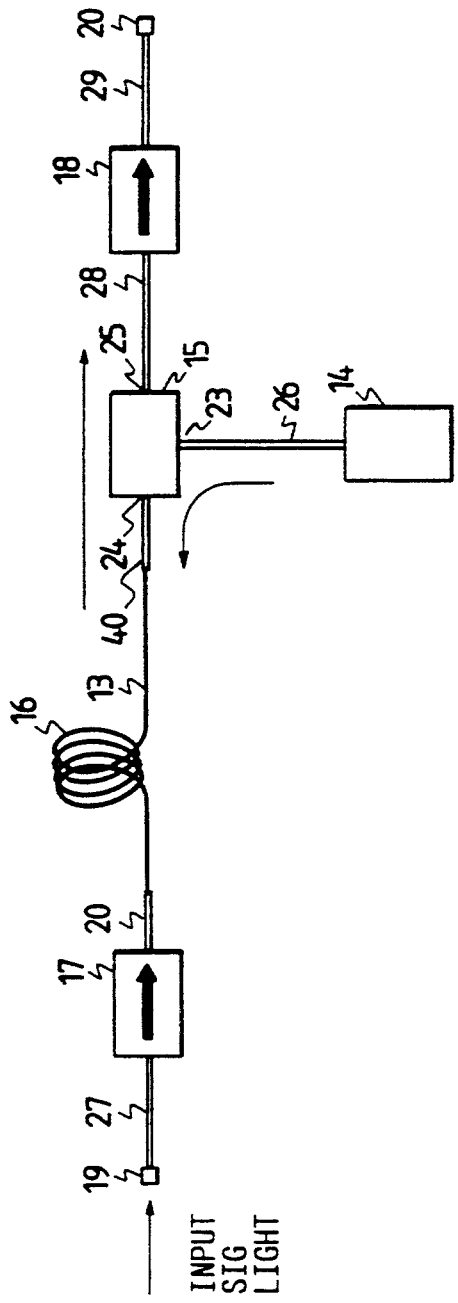
FIG. 5 is a block diagram of an embodiment of an optical fiber amplifier.

Hereinbelow will be described an embodiment of optical fiber amplifier of this invention. FIG. 5 is a block diagram of the embodiment of the optical fiber amplifier.

The optical fiber amplifier for amplifying an input light having a first wavelength (1550 nm), comprises: a first optical isolator 17 for one-way-transmitting the input light from an input terminal 19 transmitted through an optical fiber 27 toward an optical fiber 13; the optical fiber 13 comprising a quartz type fiber whose core is doped with a rare earth element of erbium Eb, a portion of the optical fiber 13 is formed to have a polarizing control element 16; a laser light source 14 for emitting a laser light as an exciting light having second wavelength (1480 nm); a wavelength division multiplexer 15 having first to third terminals 23, 24, and 25 for multiplexing and dividing first and second beams respectively having first and second wavelengths, the first terminal 23 being connected to the laser light source 14 through an optical fiber 26; the second terminal 24 being connected to an optical fiber 40 connected to the optical fiber 13; a second optical isolator 18 for one-way-transmitting light from the third terminal 25 of the wavelength division multiplexer 15 through an optical fiber 28 toward an output terminal 20 for outputting output light from the second isolator 18 through an optical fiber 29. The optical fiber 13 is connected to the optical fibers 20 and 40 by the fused splice method.

Hereinbelow will be described the operation of the third embodiment.

The input signal light is inputted from the terminal 19 and is transmitted to the first optical isolator 17 through an optical fiber 27. The optical isolator 17 transmits the input signal light to the optical fiber 13 through an optical fiber 20.

Figure 8:
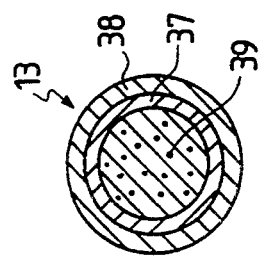
FIG. 8 is a cross-sectional view of the optical fiber used in the optical fiber amplifier of this embodiment.

FIG. 8 is a cross-sectional view of the optical fiber 13 used in the optical fiber amplifier of this embodiment. The optical fiber 13 is a quartz type fiber and its core 37 covered with a clad layer 38 is doped with erbium Er 39. The optical fiber 13, to which the exciting light is supplied, amplifies the input light with a predetermined gain, for example, 1000. The exciting light (pump light) is generated by the laser light source 14 and is introduced into the optical fiber 13 by the wavelength division multiplexer 15. In this embodiment, the input light has wavelength $\lambda_1$ of 1550 nm and the exciting light has a wavelength of 1480 nm. Thus, the optical fiber 13 outputs the amplified signal light having a wavelength of 1550 nm with amplification.

The wavelength division multiplexer 15 transmits light having the first wavelength $\lambda_1$ (1550 nm) through the second and third terminals 24 and 25. That is, the amplified signal light is transmitted from the second terminal 24 to the third terminal 25. The wavelength division multiplexer 15 introduces light having the second wavelength $\lambda_2$ (1480 nm) into the optical fiber 13 through the first and the second terminals 23 and 24. That is, the laser light from the laser light source 14 is transmitted from the first terminal 23 to the second terminal 24. The wavelength division multiplexer 15 comprises a dichroic mirror or a fused fiber coupler, etc.

The second isolator 18 transmits the amplified signal light from the wavelength division multiplexer 15 to the output terminal 20 and stops light from the output terminal 20. The optical isolators 17 and 18 prevent laser oscillation of the optical fiber amplifier due to reflection at input and output terminals 19 and 20.

The optical fiber 13 includes the polarizing control element 16. The polarizing control element 16 is formed such that a portion of the optical fiber 13 is coiled. In this embodiment, the optical fiber 13 is coiled four turns with a radius of 3.2 cm and is then processed to keep this form. Such a polarizing control element 16 provides $\pi/4$ of retardation with respect to light incident thereinto. Therefore the polarizing control element 16 turns a polarizing plane of the output laser light by $\pi/4$ per one transmission therethrough.

This optical fiber amplifier has the gain, so that multi-reflection at both ends of the optical fiber 13 would cause interference noise. However, due to the polarizing control element 16, interference noise is reduced. That is, the amplified laser light is partially reflected at the both ends of the optical fiber 13 and is subjected to retardation of $\pi/4$ per one transmission through the polarizing control element 16. Therefore, the amplified signal light without reflection emitted from the optical fiber 13 has different retardation from the multi-reflected light emitted from the optical fiber 13 by $\pi/2$. Therefore, the output laser light and the multi-reflected laser light do not interfere with each other, so that interference noise caused by multi-reflection in the optical fiber 13 is reduced.

In this embodiment, the optical fiber 13 is a fiber whose core 37 is doped with the rare earth element erbium. However, as rare earth elements, neodymium Nd or praseodymium Pr may be used. In such a system, an input signal light having wavelength of 1300 nm can be used.

Figure 6:
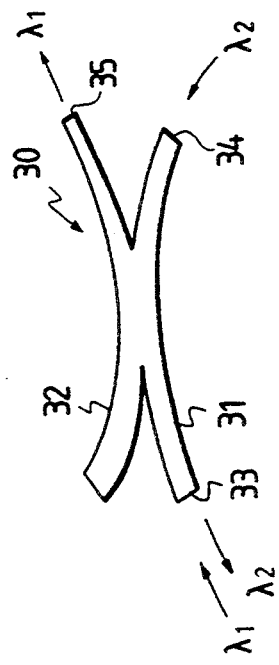
FIG. 6 is a schematic diagram of a fused fiber coupler for showing an example of the wavelength division multiplexer of the optical fiber amplifier.

FIG. 6 shows a schematic diagram of a fused fiber coupler for showing an example of wavelength division multiplexer 15. The fused fiber coupler comprises first and second optical fibers 31 and 32 fused and combined together at a predetermined portion. The amplified signal light having first wavelength $\lambda_1$ is inputted into an end 33 of the first optical fiber 31 and is emitted from the opposite end 35 of the second optical fiber 32. The laser light having the second wavelength $\lambda_2$ is inputted into the other end 34 of the first optical fiber 31 and emitted at the end 33.

Figure 7:
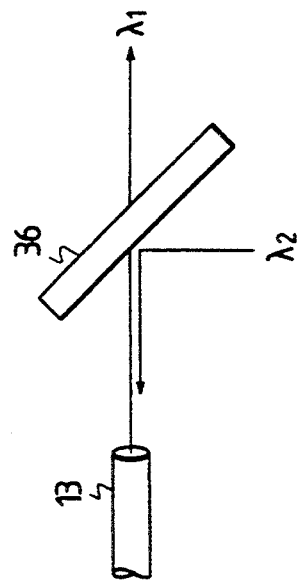
FIG. 7 is a schematic diagram of a dichroic mirror for showing another example of wavelength division multiplexer.

FIG. 7 is a schematic diagram of a dichroic mirror for showing another example of wavelength division multiplexer 15. The dichroic mirror 36 transmits the amplified signal light having the first wavelength $\lambda_1$ and introduces the exciting laser light $\lambda_2$ toward the optical fiber 13.

As mentioned above, the optical fiber amplifier of this embodiment has: an optical fiber 13 having a core 37 to which a rare earth 39 is doped for receiving a signal light having a first wavelength $\lambda_1$ at a first end thereof and for transmitting the signal light, the optical fiber 13 including polarizing control element 16 provided in the optical fiber 13, for changing a polarizing plane of the signal light by a predetermined angle, namely, $\pi/4$, per each transmission therethrough in order to differentiate an angle of polarizing plane of the signal light emitted from the optical fiber 13 without multi-reflection at both ends of the optical fiber 13 from that of the signal light subjected to the multi-reflection; a laser light source 14 for emitting a laser light having a second wavelength $\lambda_2$ shorter than the first wavelength $\lambda_1$; and a wavelength division multiplexer 15 having first, second, and third terminals 23, 24, and 25 for introducing the laser light into the optical fiber 13 through the first and second terminals 23 and 24, the laser light exciting the rare earth 39 which emits the laser light amplified in response to the signal light; for receiving the amplified signal light at the second terminal 24; and for outputting the amplified signal at the third terminal 25.

As mentioned above, according to the first embodiment, the RF-multiplexed analog video signals are added to the pilot signal 22. The laser module 3 emits the laser light with amplitude modulation with the added analog video signals. The frequency of the pilot signal 22 is smaller than the bandwidth of the laser light from the laser module 3, so that peak levels of noise developed by multi-reflection at both ends of the optical fiber 4 are reduced. This is because interference noise caused by the pilot signal 22 diffuses interference noise caused by the RF-multiplexed analog video signals.

According to the second embodiment, in the optical transmission system, the polarizing control element 10 is provided in the transmission line, there is a quadrature relation between the signal light and the multi-reflected light because once transmission through the polarizing control element 10 causes a retardation of $\pi/4$, so that twice reflected signal light has retardation of 3 $\pi/4$. The signal light and the multi-reflected signal light having the quadrature relation do not develop interference noise.

According to the embodiment of the optical fiber amplifier, the polarizing control element 16 is provided in the optical fiber 13, so that adverse effect due to multi-reflection of the signal light which is also amplified in the Er-doped optical fiber 13 can be reduced. This is because the polarizing control element 16 is provided in the transmission line, there is a quadrature relation between the signal light and the multi-reflected light because once transmission causes a retardation of $\pi/4$, so that twice reflected signal light has retardation of 3 $\pi/4$. The signal light and the multi-reflected signal light having the quadrature relation do not causes interference noise.

What is claimed is:

1. An analog optical transmission system comprising:
   (a) adding means for adding an electric pilot signal having a predetermined intensity and a predetermined frequency to an electric input analog signal and for outputting a light modulation signal;
   (b) laser modulating means responsive to said light modulation signal for emitting laser light and for directly modulating said laser light in accordance with said light modulation signal to provide laser light intensity-modulated and frequency-modulated in accordance with said light modulation signal, a spectrum of said laser light being spread by said input analog signal and said pilot signal included in said light modulation signal, said predetermined frequency of said electric pilot signal being smaller than a bandwidth of said laser light;
   (c) an optical transmission line, coupled to said laser modulating means, for transmitting said laser light; and
   (d) photosensitive means, coupled to said optical transmission line, for receiving the transmitted laser light and for photoelectrically converting the transmitted laser light to an electrical output signal.

2. An analog optical transmission system as claimed in claim 1, wherein said adding means comprises a summing amplifier.

3. An analog optical transmission system as recited in claim 1, wherein said adding means outputs an electrical light modulation signal.

4. An analog optical transmission system as recited in claim 1, wherein said laser modulating means is connected to receive an electrical light modulation signal from said adding means, and modulates said laser light in direct response to said electrical light modulation signal.

5. An analog optical transmission system comprising:
   (a) laser modulating means for emitting laser light and for intensity-modulating said laser light in accordance with an input signal;
   (b) optical transmission line having two ends, said optical transmission line coupled to said laser modulating means for transmitting said modulated laser light, including:
   polarizing control means provided in said optical transmission line, for changing an angle of a polarizing plane of said modulated laser light by a predetermined angle for each transmission therethrough, wherein said predetermined angle is determined such that said polarizing plane of said laser light transmitted once through said polarizing control means is different by substantially $\pi/2$ from a polarizing plane of said laser light transmitted three times through said polarizing control means due to multi-reflection at both ends of said optical transmission line; and
   (c) photosensitive means, coupled to said optical transmission line, for receiving the transmitted laser light and for photoelectrically converting the transmitted laser light to an electrical output signal.

6. Analog optical transmission system as claimed in claim 5, wherein said optical transmission line comprising an optical fiber and said polarizing control means formed with a portion of said optical fiber by coiling of said portion of said optical fiber.

7. An analog optical transmission system comprising:
   (a) adding means for adding an electric pilot signal having a predetermined intensity and a predetermined frequency to an electric input analog signal and for outputting a light modulation signal;
   (b) laser modulating means responsive to said light modulation signal for emitting laser light intensity-modulated and frequency-modulated in accordance with said light modulation signal, a spectrum of said laser light being spread by said input analog signal and said pilot signal included in said light modulation signal, said predetermined frequency being smaller than a bandwidth of said laser light;
   (c) an optical transmission line having two ends, said optical transmission line coupled to said laser modulating means for transmitting said laser light from said laser modulating means, said optical transmission line including:
   polarizing control means provided in said optical transmission line, for changing an angle of a polarizing plane of said modulated laser light by a predetermined angle for each transmission therethrough,
   said predetermined angle determined such that said polarizing plane of said laser light transmitted once through said polarizing control means is different by substantially $\pi/2$ from a polarizing plane of said laser light transmitted three times through said polarizing control means due to multi-reflection at both ends of said optical transmission line; and
   (d) photosensitive means, coupled to said optical transmission line, for receiving the transmitted laser light and for photoelectrically converting the transmitted laser light to an electrical output signal.

* * * * *